United States Patent
Ford et al.

(10) Patent No.: US 9,222,362 B2
(45) Date of Patent: Dec. 29, 2015

(54) HYBRID METAL LEADING EDGE PART AND METHOD FOR MAKING THE SAME

(75) Inventors: Jeffery L. Ford, Bristol, CT (US);
Benjamin Adams, Bristol, CT (US);
Michael Schroder, Bristol, CT (US);
Eric Cutiongco, Bristol, CT (US)

(73) Assignee: Barnes Group Inc., Bristol, CT (US)

( * ) Notice: Subject to any disclaimer, the term of this patent is extended or adjusted under 35 U.S.C. 154(b) by 964 days.

(21) Appl. No.: 13/288,395

(22) Filed: Nov. 3, 2011

(65) Prior Publication Data
US 2012/0114494 A1    May 10, 2012

Related U.S. Application Data

(60) Provisional application No. 61/410,391, filed on Nov. 5, 2010, provisional application No. 61/431,092, filed on Jan. 10, 2011.

(51) Int. Cl.
| | |
|---|---|
| *F01D 5/14* | (2006.01) |
| *B22F 7/06* | (2006.01) |
| *B23P 15/04* | (2006.01) |
| *B22F 3/15* | (2006.01) |
| *F04D 29/32* | (2006.01) |

(52) U.S. Cl.
CPC . *F01D 5/147* (2013.01); *B22F 3/15* (2013.01); *B22F 7/06* (2013.01); *B23P 15/04* (2013.01); *F04D 29/324* (2013.01); *F05D 2240/303* (2013.01); *Y02T 50/672* (2013.01); *Y10T 29/49337* (2015.01)

(58) Field of Classification Search
USPC .............................. 416/224, 229 A; 29/889.71
See application file for complete search history.

(56) References Cited

U.S. PATENT DOCUMENTS

| | | | |
|---|---|---|---|
| 3,758,234 A | | 9/1973 | Goodwin |
| 4,006,999 A | | 2/1977 | Brantley et al. |
| 4,010,530 A | * | 3/1977 | Delgrosso et al. .......... 29/889.71 |
| 4,728,262 A | * | 3/1988 | Marshall ....................... 416/224 |
| 4,738,594 A | * | 4/1988 | Sato et al. ..................... 416/224 |
| 5,016,805 A | | 5/1991 | Cadwell |
| 5,129,787 A | * | 7/1992 | Violette et al. ................ 416/226 |
| 5,144,825 A | | 9/1992 | Burg et al. |
| 5,240,376 A | | 8/1993 | Velicki |
| 5,243,758 A | | 9/1993 | LeMonds et al. |
| 5,384,959 A | | 1/1995 | Velicki |
| 5,881,972 A | | 3/1999 | Smith et al. |
| 5,941,446 A | | 8/1999 | Yasui |
| 5,975,465 A | | 11/1999 | Donal et al. |
| 6,003,754 A | * | 12/1999 | Rhodes ......................... 228/106 |
| 7,510,778 B2 | | 3/2009 | Bernard et al. |

(Continued)

FOREIGN PATENT DOCUMENTS

EP    1738 861    3/2007

OTHER PUBLICATIONS

U.S. Searching Authority, International Search Report and Written Opinion, dated Feb. 22, 2012 for related PCT/US2011/059103.

*Primary Examiner* — Nathaniel Wiehe
*Assistant Examiner* — Michael Sehn
(74) *Attorney, Agent, or Firm* — Fay Sharpe LLP

(57) ABSTRACT

A leading edge for use as a leading edge reinforcement on a blade or airfoil part. The leading edge has a main body that includes two leg sections. A metal deposition layer is applied to the main body to form the outer end portion of the leading edge. The main body can be formed of one or more pieces.

10 Claims, 8 Drawing Sheets

(56) References Cited

U.S. PATENT DOCUMENTS

| | | |
|---|---|---|
| 7,780,410 B2 | 8/2010 | Kray et al. |
| 7,780,420 B1 | 8/2010 | Matheny |
| 7,805,839 B2 | 10/2010 | Cammer |
| 2003/0143074 A1 | 7/2003 | Tsukamoto et al. |
| 2004/0184921 A1 | 9/2004 | Schreiber |
| 2007/0092379 A1* | 4/2007 | Coupe et al. ............... 416/241 R |
| 2008/0024041 A1* | 1/2008 | Shibata ..................... 310/340 |
| 2009/0162207 A1 | 6/2009 | Peters et al. |
| 2009/0202338 A1 | 8/2009 | Groth et al. |
| 2010/0226778 A1 | 9/2010 | Wallis |
| 2010/0242843 A1 | 9/2010 | Peretti et al. |

\* cited by examiner

HYBRID METAL LEADING EDGE PART AND METHOD FOR MAKING THE SAME

The present invention claims priority on U.S. Provisional Patent Application Ser. Nos. 61/410,391 filed Nov. 5, 2010 and 61/431,092 filed Jan. 10, 2011, both of which are incorporated herein by reference.

The present invention is directed to a novel process for forming a metal part using a metal deposition process, more particularly to a process for fabricating a leading edge for a component such as, but not limited to, an engine fan blade, an aircraft wing, etc. by use of a novel metal deposition process, and a method for making such a part.

BACKGROUND OF THE INVENTION

High-strength metal parts are commonly used in the airspace industry. These parts are generally formed of metals and metal alloys that have a high melting point temperature and/or are difficult to form. As such, when special part profiles are required for the metal parts such as a leading edge on an engine fan blade or the like, these metal parts can be difficult, time consuming and expensive to manufacture.

Aircraft components such as blades are commonly constructed of a composite laminate or molded fiber. The metal leading edge ("MLE") is typically formed of a protective strip that is applied to the blade. The MLE is commonly used to protect composite blades from impact and erosion damage that can occur during use. Typically, a V-shaped protective metallic strip is often wrapped around the leading edge and sides of the blade to provide the desired protection to the blade.

The MLE protective strips can be made from a variety of materials such as titanium and titanium alloys. These two materials are commonly used due to their desirable weight, strength and mechanical properties. Generally, hot forming techniques are used to create the protective strips. Such processes can be time consuming and expensive, and can also result in high yield losses, especially when attempting to fabricate thin, complex geometries for the protective strips.

Another type of MLE process is an additive manufacturing process that involves the buildup of a metal part or preformed to make a near net shape ("NNS") component. This manufacturing process can be used to make components from expensive materials. When a high temperature, melt-based process (e.g., plasma transferred arc, laser cladding, etc.) is used as the additive method to make a NNS component, complex tools can be used in such manufacturing process. One such tool is described and illustrated in U.S. 2010/0242843.

Several prior art manufacturing methods for forming leading edges on metal materials are disclosed in U.S. 2010/0242843; U.S. 2009/0162207; U.S. Pat. No. 7,805,839; U.S. Pat. No. 7,780,420; U.S. Pat. No. 7,780,410; U.S. Pat. No. 7,510,778; U.S. Pat. No. 5,975,465; U.S. Pat. No. 5,941,446; U.S. Pat. No. 5,881,972; U.S. Pat. No. 5,384,959; U.S. Pat. No. 5,243,758, U.S. Pat. No. 5,240,376; U.S. Pat. No. 5,144,825; U.S. Pat. No. 5,016,805; U.S. Pat. No. 4,006,999; U.S. Pat. No. 3,758,234; and EP1738861, all of which are incorporated herein by reference.

Although leading edges for use on blades is common, the formation of the leading edge for blades that require very small error tolerances can be difficult to make, especially when the blade onto which the leading edge is to be applied is large. This is especially a problem at the end or nose region of the leading edge. Due to advances in aerospace technology, the nose or end region of the leading edge is used to not only protect the edge of the blade, but to also create an end profile of the blade that can increase the efficiency of the blade and/or operation of the aircraft engine. As such, special nose or edge profiles are required on the leading edge. Such special leading edge profiles can be difficult or impossible to obtain using standard technologies used to form leading edges.

In view of the current state of the art for manufacturing high-strength precision metal parts, there is a need for a manufacturing method that can create a leading edge in a time-effective and cost effective-manner, that can create a leading edge having certain profiles, and which method can repeatedly form a leading edge with small error tolerances.

SUMMARY OF THE INVENTION

The present invention is directed to a novel process for fabricating a leading edge such as a metal leading edge (MLE) for a component such as but not limited to an engine fan blade, an aircraft wing, etc. that addresses the past problems associated with the manufacture of such leading edges.

In one non-limiting aspect of the present invention, the novel process can be used to develop a metal leading edge (MLE) for blades or airfoil-type structures using one or more machined and hot formed sheets of titanium, or any other appropriate alloy. When two or more metal pieces are used, the multiple pieces are assembled by welding, which is then built-up by metal deposition or a laser additive manufacturing process using a metal appropriate alloy to form the near or final profile of the leading edge.

In another and/or alternative non-limiting aspect of the present invention, the novel process can include the step of hot isostatic pressing the welded metal part to improve densification of the leading edge.

In still another and/or alternative non-limiting aspect of the present invention, the novel process can include the step of heat treating/hot sizing the leading edge to obtain the proper material properties of the leading edge and/or to improve the shape of the leading edge.

In yet another and/or alternative non-limiting aspect of the present invention, the novel process can include the step of the end/nose and/or the outer surfaces of the leading edge being machined and/or blended to the desired dimensions of the final profile of the leading edge.

In still yet another and/or alternative non-limiting aspect of the present invention, the novel process can include the step of machining the back of the end/nose and/or the inner surfaces of the leading edge to reduce or remove stress concentration areas, to improve bonding of the deposited metal to the leading edge, and/or to improve bonding to the leading edge to the blade or airfoil: type structure.

In another and/or alternative non-limiting aspect of the present invention, the novel process can include the step of trimming the leading edge by use of a laser cutter, or any appropriate method, and then optionally benching the leading edge.

In still another and/or alternative non-limiting aspect of the present invention, the novel process can include the step of roughening the inner surfaces of the leading edge to improve bonding of the leading edge to the body of the blade or the airfoil-type structure and then optionally etching and/or priming the roughened areas of the leading edge and/or regions about the leading edge and body of the blade or the airfoil-type structure.

In yet another and/or alternative non-limiting aspect of the present invention, the novel process of the main body of the leading edge can be pre-processed by one or more of the following steps: 1) stamp and/or laser cut one or more blank sheet pieces that form the main body of the leading edge, 2) machine one or more portions of the one or more blank sheet pieces that form the main body of the leading edge to get the proper tapered profile or the one or more blank sheet pieces that form the main body of the leading edge prior to connecting together the one or more portions of the blank sheet pieces that form the main body of the leading edge, 3) deburr one or more portions of the blank sheet pieces that form the main body of the leading edge prior to connecting together the one or more portions of the blank sheet pieces that form the main body of the leading edge, 4) hot forming one or more portions of the blank sheet pieces that form the main body of the leading edge prior to connecting together the one or more portions of the blank sheet pieces that form the main body of the leading edge, 5) machine (e.g., prepare edges, etc.) one or more portions of the blank sheet pieces that form the main body of the leading edge that are to be connected together (e.g., welded, diffusion bonded, etc.), and/or 6) bench to remove burrs/remove surface anomalies as needed prior to connecting together the one or more portions of the blank sheet pieces that form the main body of the leading edge.

In still yet another and/or alternative non-limiting aspect of the present invention, the novel process of the main body of the leading edge can be processed by one or more of the following steps after the preprocessing of the main body of the leading edge prior to or after the depositing of metal on the nose or end portion of the main body of the leading edge: 1) weld and/or diffusion bond one or more portions of the blank sheet pieces that form in the main body of the leading edge, 2) X-ray and/or Ultrasonic NDT one or more portions of the leading edge, 3) HIP one or more portions of the leading edge, 4) heat treat and/or hot size one or more portions of the leading edge, 5) machine the end or nose portion of the main body of the leading edge, 6) machine the metal that was deposited in the end or nose portion of the main body of the leading edge, 7) machine inner nose weld root on the main body of the leading edge, 8) trim one or more portions of the leading edge, 8) bench to remove burrs/remove surface anomalies as needed on one or more portions of the leading edge, 9) roughen one or more portions of the leading edge, and/or 10) etch and/or prime (depending on end use) one or more portions of the leading edge.

It is one non-limiting object of the present invention to form a leading edge that can be used on a blade or an airfoil-type structure.

It is another and/or alternative non-limiting embodiment to form a leading edge having certain end or nose profiles.

It is still another and/or alternative non-limiting embodiment to form a leading edge by use of a metal deposition process.

It is yet another and/or alternative non-limiting embodiment to a novel leading edge structure by a novel metal deposition process.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein.

DETAILED DESCRIPTION OF NON-LIMITING EMBODIMENTS

Figure 1:
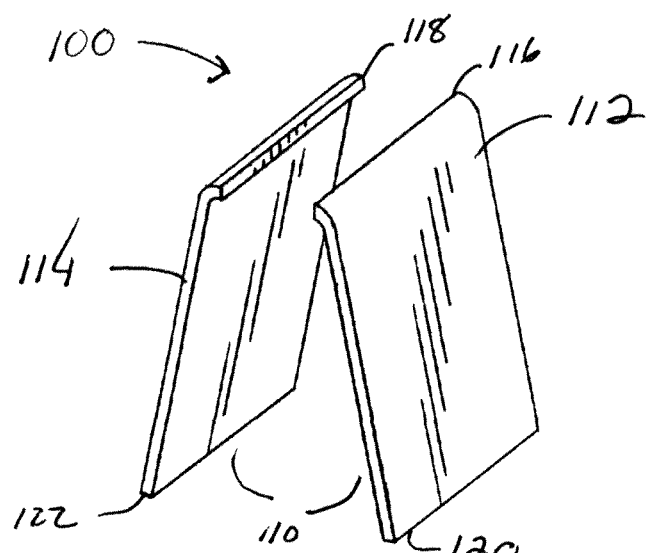
FIG. 1 is a side elevation view of two halves of a main body of a leading edge.

Referring now to the drawings wherein the showings are for the purpose of illustrating non-limiting embodiments of the invention only and not for the purpose of limiting same, FIGS. 1-17 illustrate five non-limiting embodiments of a leading edge forming process and five different leading edges that can be formed by such manufacturing process in accordance with the present invention. The present invention will be described in detail with respect to the forming of a leading edge for use on a blade such as a propeller or fan blade of an aircraft engine. However, it can be appreciated, that the leading edge formed in accordance with the present invention can be used for other applications (e.g., fan blades for engines other than air craft engines, helicopter blades, blades for fans, etc.) It can also be appreciated that the process of the present invention can be used to form leading edges that can be used on parts other than blades (e.g., aircraft wings, etc.). The invention will also be described in detail with respect to the forming of leading edges from titanium and titanium alloys. However, it will be appreciated that other materials can be used to form one or more portions of the leading edge (e.g., nickel alloys, SiC materials, composite materials, other metal alloys, ceramic materials, etc.).

The basic method steps for forming a protective edge or a leading edge for use on a blade is as follows:

1. Provide one or more blank sheets (e.g., titanium sheet, titanium alloy, etc.) that form a part of or all of the main body of the leading edge; and, 2. Add metal to the end/nose region of the main body of the leading edge by a metal deposition (e.g., arc deposition, etc.) and/or laser additive process to form a leading edge having a desired profile. The deposited metal is generally the same or similar in composition to the main body of the leading edge.

One or more additional process steps can be used to form the leading edge in accordance with the present invention. Such optional process steps include:

a. Hot form/super plastic form ("SPF") one or more portions of the leading edge before and/or after metal deposition. This step is generally used to achieve desired form/contour of the one or more components of the main body of the leading ledge. This step can optionally be used after the metal deposition step to remove any distortion that may have occurred to the main body during the depositing of metal on the main body.

b. Weld together (e.g., laser weld, arc welding, ultrasonic welding, etc.) and/or diffusion bond together the end/nose region of two or more blank sheets to form the main body of the leading edge.

c. Machine one or more portions of the one or more blank sheets to obtain the proper tapered profile prior to hot forming, diffusion bonding, and/or welding of the one or more blank sheets. The edges of the one or more blank sheets to be welded can be machined prior to welding and/or diffusion bond to ensure a good fit with one another so as to increase the strength of the weld or bond.

d. Deburr one or more portions of blank sheet(s) prior to hot forming, diffusion bonding, and/or welding.

e. Machine (prepare) a portion or all of the edges on the one or more blank sheets that will be welded and/or diffusion bonded, wherein such machining can occur before and/or after any hot forming process.

f. Bench to remove burrs/remove surface anomalies as needed during and/or after the forming of the leading edge. Benching is generally a manual process that results in the removal of small burrs and other abnormalities on the leading edge.

g. Conduct X-ray or Ultrasonic NDT during the forming and/or after the forming of the leading edge. The X-ray or NDT (Non-Destructive Testing) can be used to identify non-acceptable indications (i.e., flaws) in the leading edge.

h. Hot isostatic press ("HIP") leading edge. HIP can be used to facilitate in partially or fully eliminating porosity and voids in the deposited material on the end or nose region of the leading edge. As such, HIP is generally used after the metal deposition process.

i. Heat treat/hot size the leading edge after metal deposition. The leading edge can be heat treated to relieve the stress imposed on the leading edge by the metal deposition process.

j. Machine the end or nose of the leading edge prior to and/or after the metal deposition process.

k. Machine inner end/nose weld root of the leading edge before/after the metal deposition process. The inner nose root can be machined to alleviate any stress risers in the leading edge and/or to create a surface finish that will facilitate in the bonding of the leading edge to the airfoil/blade/wing structure.

l. Trim (laser, mechanical, etc.) the leading edge.

m. Etch and/or Prime (depending on end use) the leading edge.

n. Weld and/or diffusion bond end/nose off-center when forming the main body of the leading edge. The weld can be directly down the centerline of the end or nose region, or it can be off center to mitigate issues during impact. The weld will be located fully or partially under the deposited material on the end or nose region.

o. Cut one or more of the blank sheets by a laser cutter.

p. Treat surfaces of formed leading edge to enhance bonding to blade or other type of airfoil part.

q. Clean one or more portions of the leading edge prior to and/or after one or more processing steps (e.g., solvents [e.g., acetone, etc.], acids, etc.).

As can be appreciated, one or more of the additional steps set forth above can be used to form the leading edge.

Referring now to FIGS. 1-5, there is illustrated one non-limiting process for forming a leading edge in accordance with the present invention. FIG. 1 illustrates a main body 110 that is formed of first and second body portions 112, 114. The two body portions have generally the same shape, size and configuration; however, this is not required. The body portions form the leg sections of the leading edge. The main body is generally formed of a metal material such as, but not limited to, titanium or titanium alloy. The top edges 116, 118 on the body portions are tapered and/or curved; however, this is not required. As can be appreciated, the shape, size and configuration of the body portions is non-limiting.

The body portions can be optionally stamped and/or laser cut from one or more pieces of a metal blank sheet. The body portions can be optionally machined to obtain a proper taper profile. The body portions can be optionally deburred. The body portions (e.g., top edges, etc.) can be optionally hot formed. The edges of the body portions can be optionally machined. The body portions can be optionally benched to remove burrs/remove surface anomalies as needed prior to connecting together the body portions.

Figure 2:
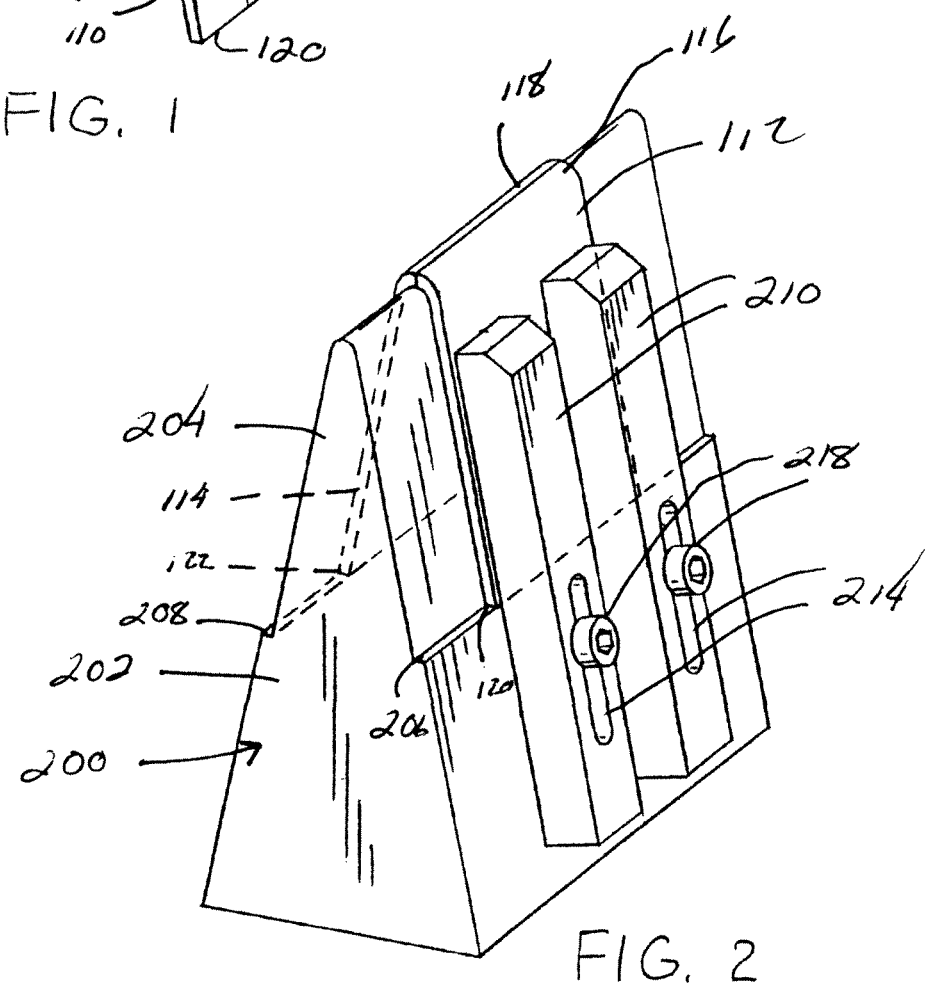
FIG. 2 is a side elevation view of a mounting tool having the two halves of the main body of the leading edge mounted thereto.

FIG. 2 illustrates a mounting tool or mandrel 200 that is used to mount the body portions of the main body in position during the forming of the leading edge 100. The mounting tool or mandrel includes a body 202 that has a top portion 204 which has a profile that is the same or closely the same as the blade or other type of airfoil part (not shown) that the leading edge 100 is to be connected to. The mounting tool or mandrel 200 includes a bottom edge 206, 208 on each side of top portion 204. The bottom edge is designed to support the bottom edge 120, 122 of the two body portions. The inclusion of a bottom ledge is optional. The mounting tool or mandrel 200 includes one or more mount posts 210, 212 that are used to clamp and/or secure the body portions 112, 114 to the top portion of the mounting tool or mandrel 200. The number, size and configuration of the mount posts is non-limiting. Generally the mount posts are designed and positioned so as to not interfere with the bonding together of the body portions and/or the metal deposition process on the top edges of the body portion. As illustrated in FIG. 2, the top edge of the mount posts is positioned below top edges 116, 118 of the body portions; however, this is not required. The mount posts each include an adjustment slot 214, 216 that is designed to receive an adjustment screw 218, 220. The end of the adjustment screw is designed to be threaded into body 202 via threaded opening 230, 232. As can be appreciated, many different or additional arrangements can be used to position and secure the one or more mount post and/or other type of securing arrangements relative to the mounting tool or mandrel 200 so as to reliably and releasably secure the body portions 112, 114 to the mounting tool or mandrel 200. The securing arrangement illustrated in FIG. 2 is a manual securing arrangement; however, it can be appreciated that an automated or semi-automated securing arrangement can be used.

As illustrated in FIG. 2, the top edges 116, 118 are positioned in contact with one another or positioned closely adjacent to one another.

Figure 3:
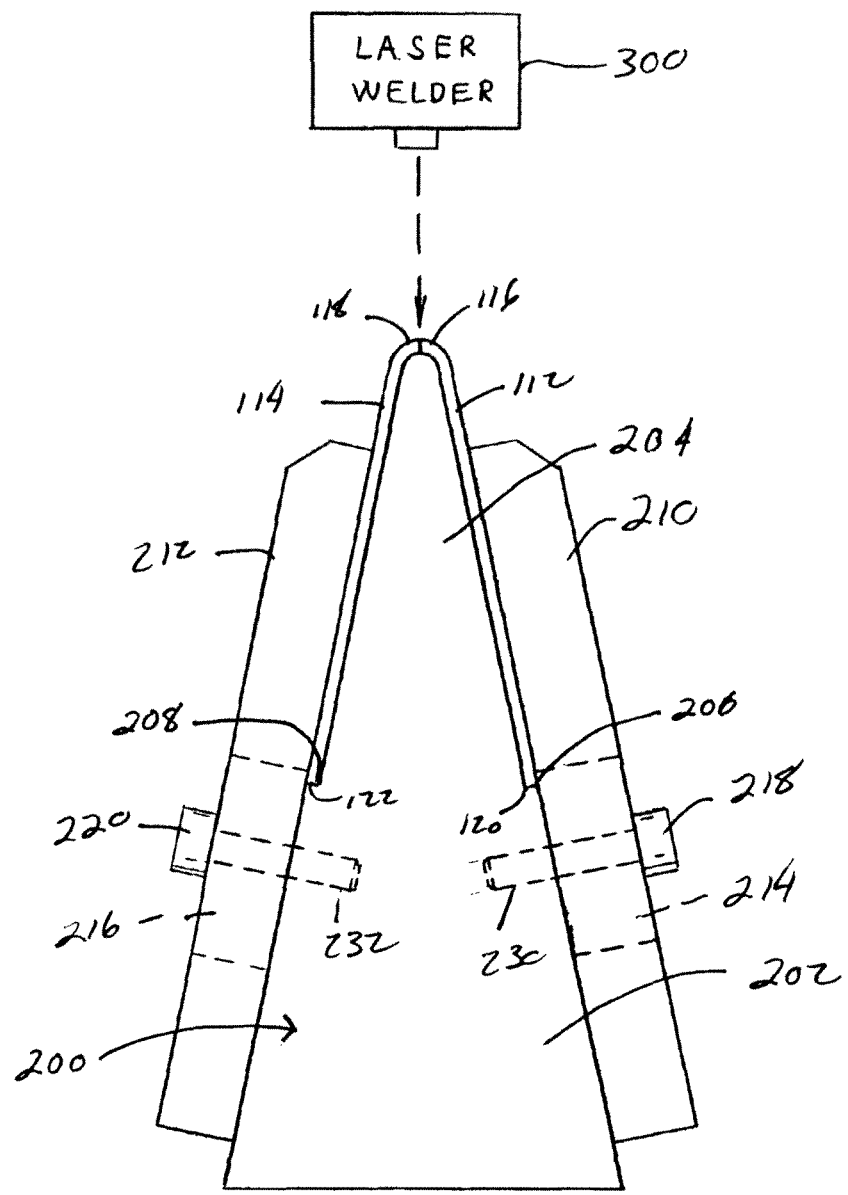
FIG. 3 is a side view of FIG. 2 illustrating the step of welding the two halves of the main body of the leading edge together at the front ends of the main body.

Once the body portions 112, 114 are positioned and secured on the mounting tool or mandrel 200, the top edges 116, 118 are bonded together to form the nose portion of the main body. As illustrated in FIG. 3, a laser welder 300 is used to bond together top edges 112, 114. As can be appreciated, other or additional techniques can be used to bond together top edges 112, 114. If a metal is used to weld together top edges 112, 114, the composition of the metal used to form the weld is generally the same as or similar to the composition of body portions 112, 114; however, this is not required. The top edges can be bonded together down the middle of the main body 110 or off-center of the main body 110.

Figure 4:
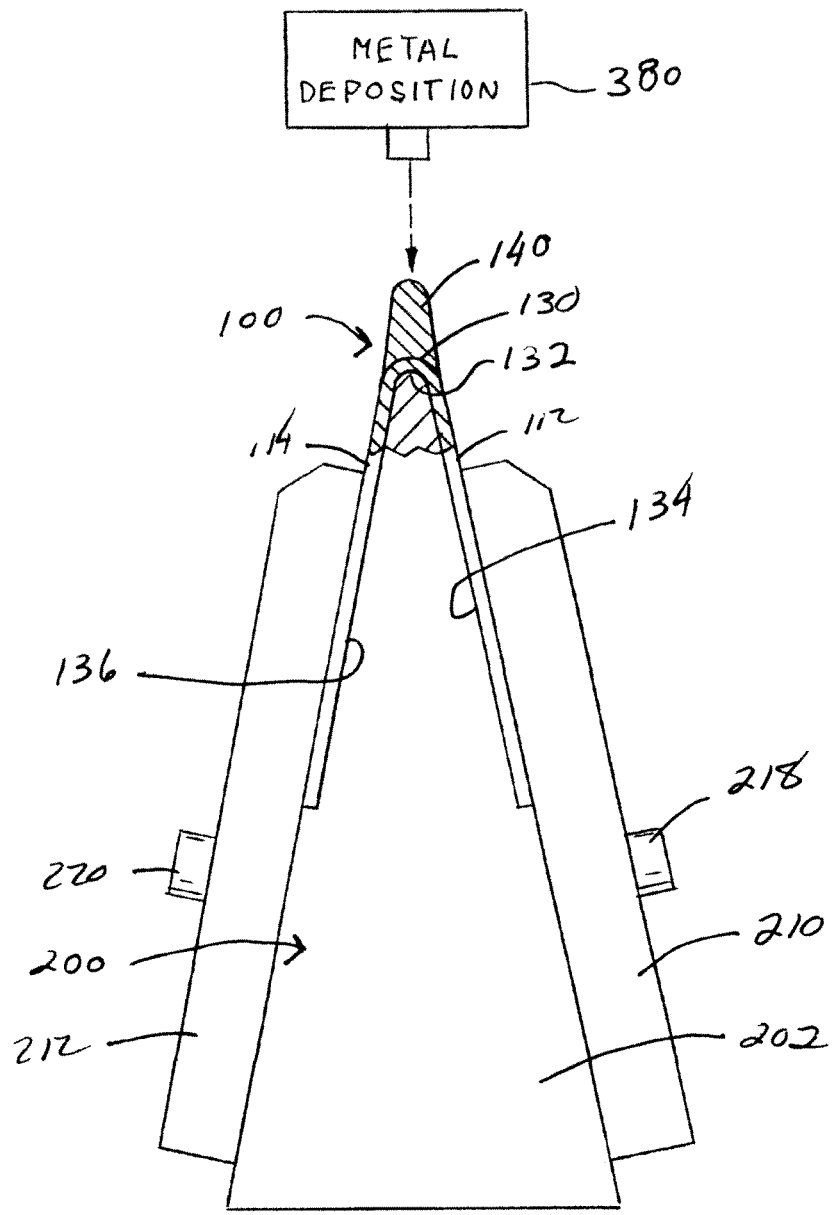
FIG. 4 is a side view of FIG. 3 illustrating the step of depositing metal on the front end or nose of the leading edge after the two halves of the main body of the leading edge have been welded together.

After top edges 112, 114 are bonded together, a metal deposition layer 140 is applied to the welded nose or end region 130 of the leading edge 100 by a metal deposition device 380. Many types of devices and process can be used to deposit metal on nose or end region 130 to form metal deposition layer 140. The metal deposition layer generally fully covers the welded region between top edges 116, 118. The metal composition of the metal deposition layer is generally uniform; however, this is not required. The metal composition of the metal deposition layer is generally the same as or similar to the composition of body portions 112, 114; however, this is not required. The size, shape and configuration of metal deposition layer 140 is non-limiting. As illustrated in FIG. 4, the metal deposition layer 140 has a tapering profile as it extends upwardly from nose or end region 130. The top region of the metal deposition layer 140 is illustrated as being rounded; however, this is not required. The height and shape of the metal deposition layer 140 is controlled so as to obtain the desired profile of the end portion of the leading edge.

Prior to, during and/or after the forming of the metal deposition layer 140 on the end or nose region 130 of the leading edge 100, one or more of the forming process steps can optionally be conducted: a) X-ray and/or Ultrasonic NDT one or more portions of the leading edge, b) HIP one or more portions of the leading edge, c) heat treat and/or hot size one or more portions of the leading edge, d) machine the end or nose region 130 of the main body of the leading edge, e) machine the metal deposition layer 140, f) machine the inner nose weld root 132 on the main body of the leading edge, g) trim one or more portions of the leading edge, h) bench to remove burrs/remove surface anomalies as needed on one or more portions of the leading edge, i) roughen one or more portions of the leading edge (e.g., inner surface 134,136 of the leading edge, etc.), j) etch and/or prime (depending on end use) one or more portions of the leading edge (e.g., inner surface 134, 136 of the leading edge, etc.), k) hot form/super plastic form ("SPF") one or more portions of the leading edge before and/or after applying the metal deposition layer 140 and/or l) clean one or more portions of the leading edge prior to and/or after one or more of the processing steps.

Once the leading edge 100 is fully formed, it can then be inserted onto or bonded to a blade or airfoil part (not shown) by known methods such as, but not limited to the methods disclosed in US 2010/0242843; US 2009/0162207; U.S. Pat. No. 7,805,839; U.S. Pat. No. 7,780,420; U.S. Pat. No. 7,780, 410; U.S. Pat. No. 7,510,778; U.S. Pat. No. 5,975,465; U.S. Pat. No. 5,941,446; U.S. Pat. No. 5,881,972; U.S. Pat. No. 5,384,959; U.S. Pat. No. 5,243,758, U.S. Pat. No. 5,240,376; U.S. Pat. No. 5,144,825; U.S. Pat. No. 5,016,805; U.S. Pat. No. 4,006,999; U.S. Pat. No. 3,758,234; and EP1738861, all of which are incorporated herein by reference.

Figure 5:
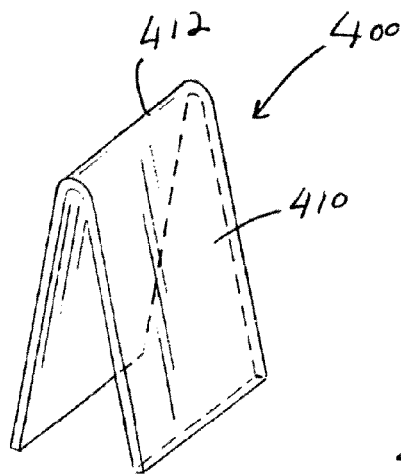
FIG. 5 is a side elevation view of a single piece main body of a leading edge.
Figure 6:
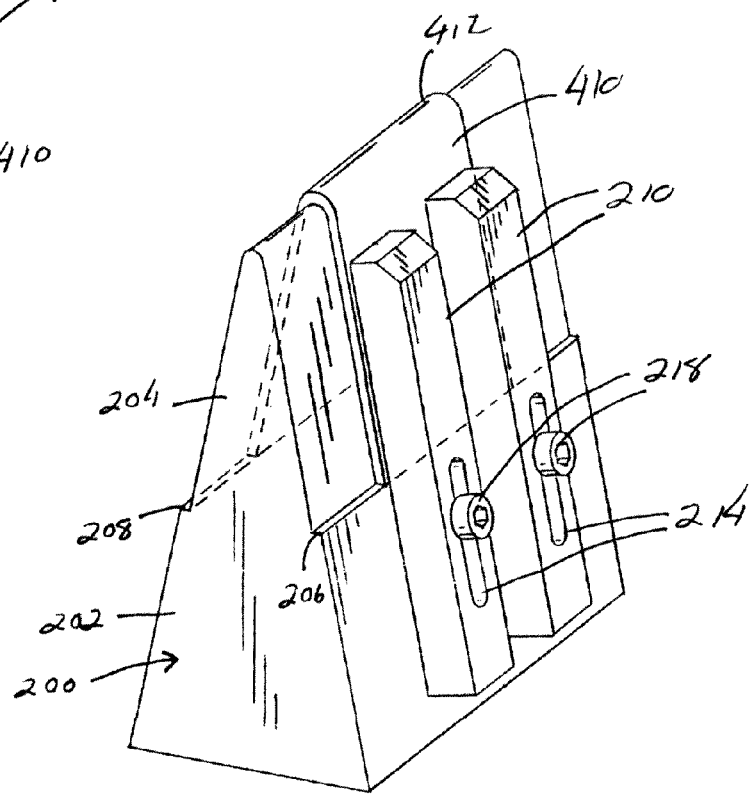
FIG. 6 is a side elevation view of a mounting tool having the single piece main body of the leading edge mounted thereto.
Figure 7:
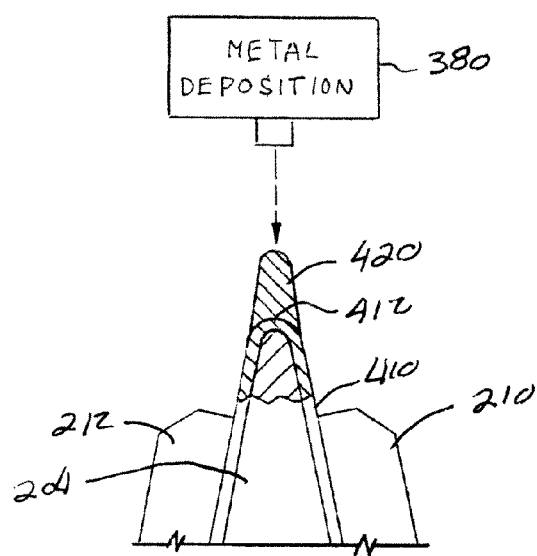
FIG. 7 is a side view of FIG. 6 illustrating the step of depositing metal on the front end or nose of the main body of the leading edge.

Referring now to FIGS. 5-7, there is illustrated another non-limiting process for forming a leading edge in accordance with the present invention. The mounting tool or mandrel illustrated in FIGS. 5-7 is the same or similar to the mounting tool or mandrel illustrated in FIGS. 1-4. As such, the parts and function of the mounting tool or mandrel will not be repeated herein and the same reference numbers for the mounting tool or mandrel will be used.

The main body 410 of leading edge 400 is illustrated as a single piece component. The main body includes two leg sections and a nose portion. The composition of the main body can be the same or different from the composition of the main body of the leading edge as described above in FIGS. 1-4. The main body is generally stamped and/or laser cut from one piece of a metal blank sheet; however, this is not required. The main body can be optionally machined to obtain a proper taper profile. The main portion can be optionally deburred. The main body can be optionally hot formed. The edges of the main portion can be optionally machined. The main body can be optionally benched to remove burrs/remove surface anomalies as needed.

As illustrated in FIG. 6, the main body 410 is mounted to the mounting tool or mandrel 200. As illustrated in FIG. 7, a metal deposition layer 420 is applied to the nose or end region 412 of the leading edge 400 by a metal deposition device 380. The metal deposition device can be the same or different from the metal deposition device described above with reference to FIGS. 1-4. The metal deposition layer generally fully covers the nose or end region 412; however this is not required. As illustrated in FIG. 7, metal deposition layer 412 covers about 80%-100% of the nose or end region 412, typically about 90%-100% of the nose or end region 412, and more typically about 95%-100% of the nose or end region 412. The metal composition of the metal deposition layer is generally uniform; however, this is not required. The metal composition of the metal deposition layer is generally the same as or similar to the composition of the main body 410; however, this is not required. The size, shape and configuration of the metal deposition layer is non-limiting. As illustrated in FIG. 7, the metal deposition layer has a tapering profile as it extends upwardly from nose or end region 412; however, this is not required. The top region of the metal deposition layer is illustrated as being rounded; however, this is not required. The height and shape of the metal deposition layer is controlled so as to obtain the desired profile of the end portion of the leading edge.

Prior to, during and/or after the forming of the metal deposition layer on the end or nose region of leading edge 400, one or more of the forming process steps can optionally be conducted: a) X-ray and/or Ultrasonic NDT one or more portions of the leading edge, b) HIP one or more portions of the leading edge, c) heat treat and/or hot size one or more portions of the leading edge, d) machine the end or nose region of the main body of the leading edge, e) machine the metal deposition layer, f) trim one or more portions of the leading edge, g) bench to remove burrs/remove surface anomalies as needed on one or more portions of the leading edge, h) roughen one or more portions of the leading edge (e.g., inner surface of the leading edge, etc.), i) etch and/or prime (depending on end use) one or more portions of the leading edge (e.g., inner surface of the leading edge, etc.), j) hot form/super plastic form ("SPF") one or more portions of the leading edge before and/or after applying the metal deposition layer and/or k) clean one or more portions of the leading edge prior to and/or after one or more of the processing steps.

Once the leading edge 400 is fully formed, it can then be inserted onto or bonded to a blade or airfoil part (not shown) by known methods.

Referring now to FIGS. 8-11, there is illustrated another non-limiting process for forming a leading edge in accordance with the present invention. The mounting tool or mandrel illustrated in FIGS. 8-11 is the same or similar to the mounting tool or mandrel illustrated in FIGS. 1-4. As such, the parts and function of the mounting tool or mandrel will not be repeated herein and the same reference numbers for the mounting tool or mandrel will be used.

Figure 8:
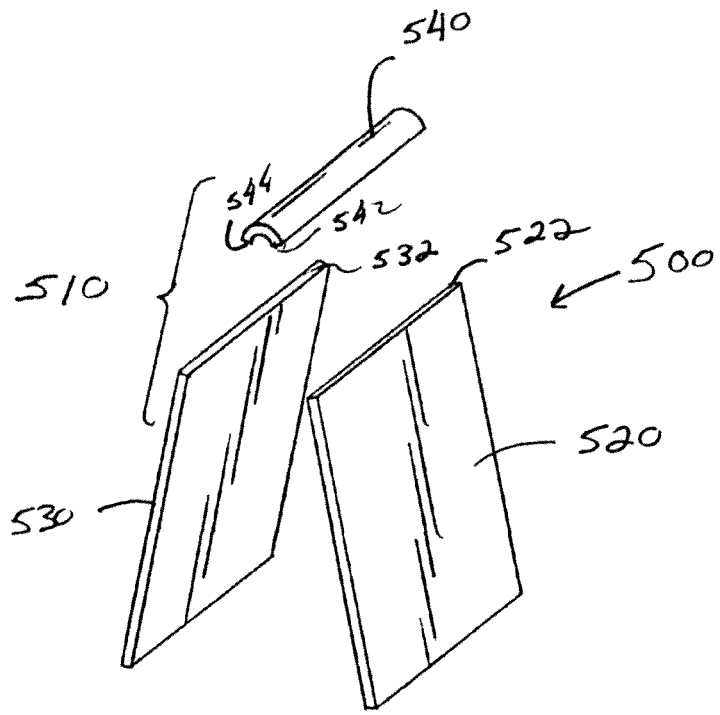
FIG. 8 is a side elevation view of the main body of a leading edge formed of two side pieces and one top piece.

FIG. 8 illustrates a main body 510 that is formed of first, second, and third body portions 520, 530, 540. Body portions 520, 530 have generally the same shape, size and configuration; however, this is not required. Body portions 520, 530 form the leg sections of the main body. Body portion 540 is illustrated as forming all or a portion of the nose or end portion 550 of the main body. Body portion 540 is illustrated as being smaller in size to body portions 520, 530; however, this is not required. Body portion 540 is illustrated as having an arcuate or curved shape; however, this is not required. The composition of body portions 520, 530, 540 is generally the same; however, this is not required. The composition of body portions 520, 530, 540 can be the same or different from the composition of the main body of the leading edge as described above in FIGS. 1-4.

Body portions 520, 530, 540 can be optionally stamped and/or laser cut from one or more pieces of a metal blank sheet pieces. The body portions can be optionally machined to obtain a proper taper profile. The body portions can be optionally deburred. The body portions (e.g., top edges, etc.) can be optionally hot formed. The edges of the body portions can be optionally machined. The body portions can be optionally benched to remove burrs/remove surface anomalies as needed prior to connecting together the body portions.

Figure 9:
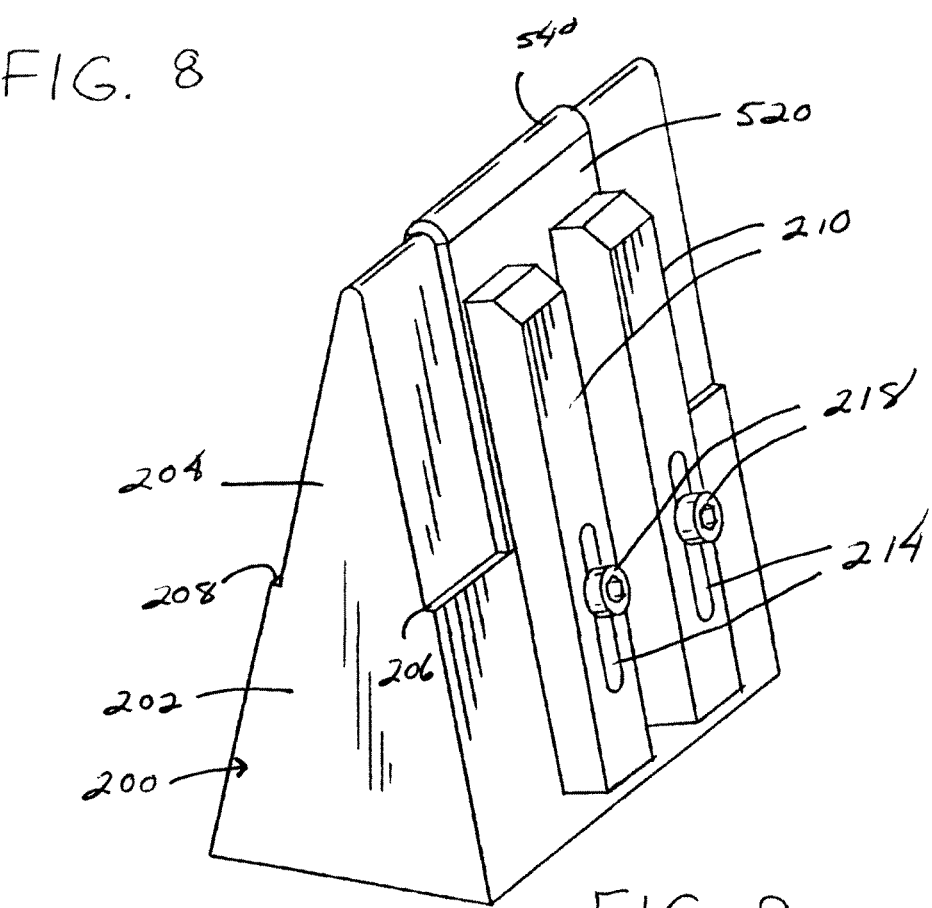
FIG. 9 is a side elevation view of a mounting tool having the two side pieces of the main body of the leading edge mounted thereto.
Figure 10:
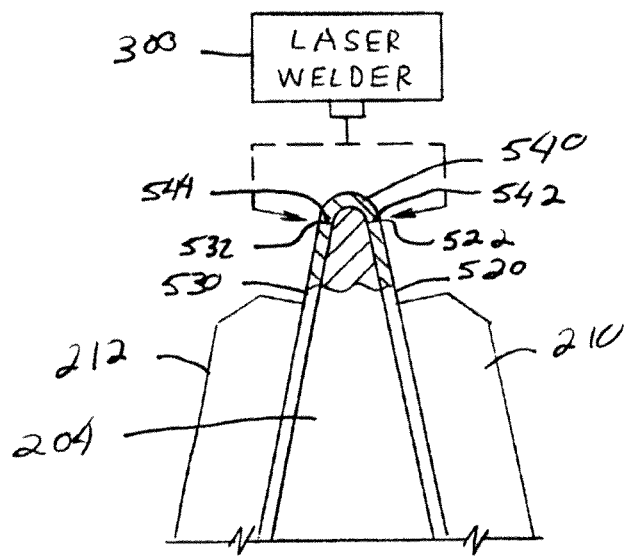
FIG. 10 is a side view of FIG. 9 illustrating the step of welding together of the three pieces of the main body of the leading edge.

As illustrated in FIGS. 9 and 10, body portions 520, 530 are secured to the mounting tool or mandrel by mount posts 210, 212. Body portion 540 is positioned on the top edge of the top portion of the mounting tool or mandrel. The bottom edges 542, 544 are positioned in contact with or positioned closely adjacent to top edges 522, 532 of body portions 520, 530.

Once the body portions 520, 530, 540 are positioned and secured on the mounting tool or mandrel, the edges 522 and 542 and edges 532 and 544 are bonded together. As illustrated in FIG. 10, a laser welder 300 is used to bond these edges together. As can be appreciated, other or additional techniques can be used to bond together the edges on body portions 520, 530, 540. If a metal is used to weld together the edges, the composition of the metal used to form the weld is generally the same as or similar to the composition of body portions 520, 530, 540; however, this is not required. The top edges can be bonded together down the middle of the edge surfaces or off-center of the edge surface.

After body portions are bonded together, a metal deposition layer 560 is applied to the top surface of body portion 540 by a metal deposition device 380. The metal deposition device can be the same or different from the metal deposition device described above with reference to FIGS. 1-4. The metal deposition layer generally fully or partially covers the welded or bonded regions between edges 522 and 542 and edges 532 and 544; however, this is not required. Generally, metal deposition layer 560 covers about 80%-100% of body portion 540, typically about 90%-100% of body portion 540, and more typically about 95%-100% of body portion 540. The metal deposition layer is also generally about 80%-100% of edges 522 and 542 and/or edges 532 and 544, typically about 90%-100% of edges 522 and 542 and/or edges 532 and 544, and more typically about 95%-100% of edges 522 and 542 and/or edges 532 and 544.

Figure 11:
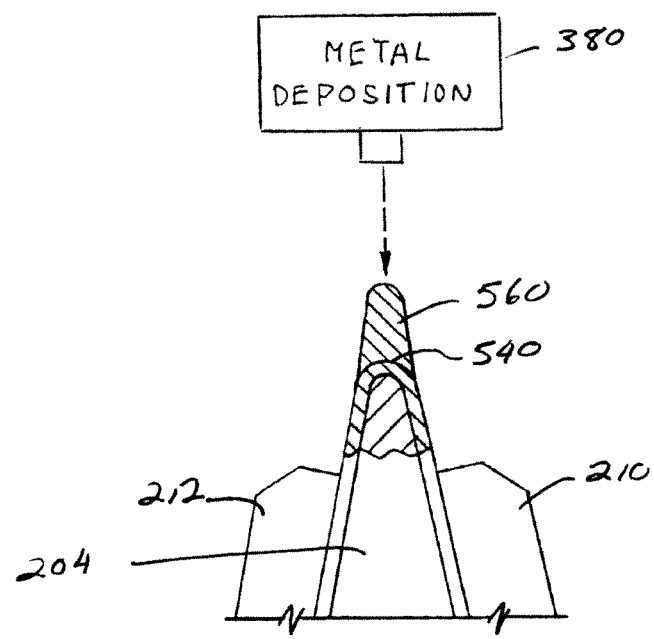
FIG. 11 is a side view of FIG. 10 illustrating the step of depositing metal on the front end or nose of the main body of the leading edge after the three pieces of the main body of the leading edge have been welded together.

The metal composition of the metal deposition layer is generally uniform; however, this is not required. The metal composition of the metal deposition layer is generally the same as or similar to the composition of the body portions 520, 530, 540; however, this is not required. The size, shape and configuration of the metal deposition layer is non-limiting. As illustrated in FIG. 11, the metal deposition layer has a tapering profile as it extends upwardly from body portion 540; however, this is not required. The top region of the metal deposition layer is illustrated as being rounded; however, this is not required. The height and shape of the metal deposition layer is controlled so as to obtain the desired profile of the end portion of the leading edge.

Prior to, during and/or after the forming of the metal deposition layer 560 on body portion 540 of the leading edge 500, one or more of the forming process steps can optionally be conducted: a) X-ray and/or Ultrasonic NDT one or more portions of the leading edge, b) HIP one or more portions of the leading edge, c) heat treat and/or hot size one or more portions of the leading edge, d) machine body portion 540 and/or the end or nose region of the main body of the leading edge, e) machine the metal deposition layer, f) machine one or both of the inner nose weld roots on the main body of the leading edge, g) trim one or more portions of the leading edge, h) bench to remove burrs/remove surface anomalies as needed on one or more portions of the leading edge, i) roughen one or more portions of the leading edge (e.g., inner surface of the leading edge, etc.), j) etch and/or prime (depending on end use) one or more portions of the leading edge (e.g., inner surface of the leading edge, etc.), k) hot form/ super plastic form ("SPF") one or more portions of the leading edge before and/or after applying the metal deposition layer and/or l) clean one or more portions of the leading edge prior to and/or after one or more of the processing steps.

Once the leading edge 500 is fully formed, it can then be inserted onto or bonded to a blade or airfoil part (not shown) by known methods.

Figure 12:
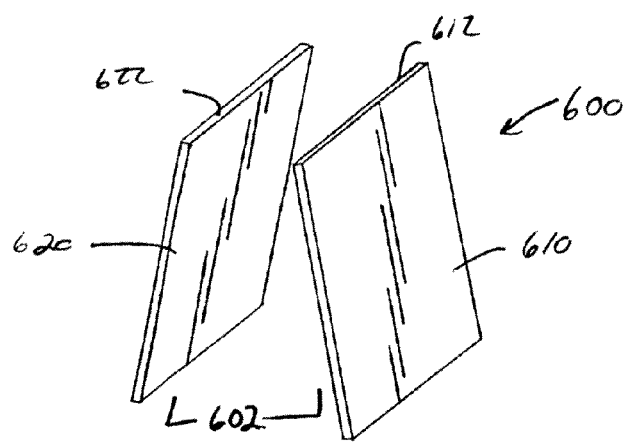
FIG. 12 is a side elevation view of two halves of the main body of a leading edge.
Figure 14:
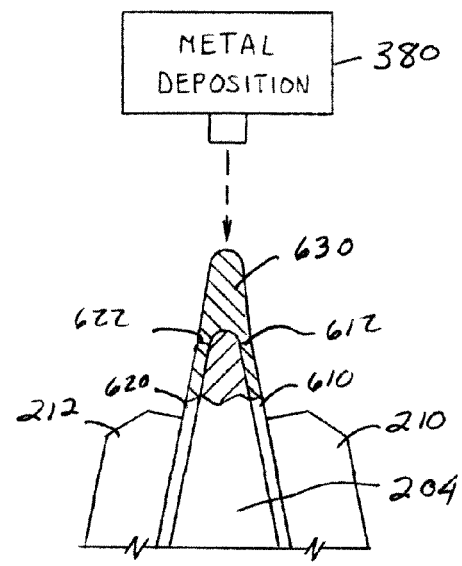
FIG. 14 is a side view of FIG. 13 illustrating the step of depositing metal on the front end of the main body of the two leading edge pieces to form the nose of the leading edge and to bond together the two leading edge pieces of the main body.
Figure 13:
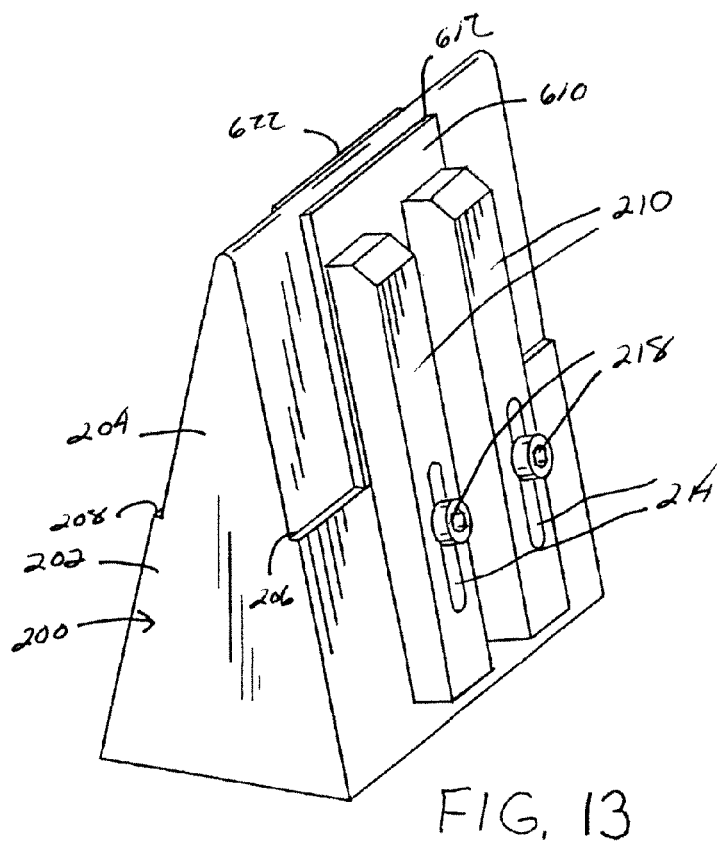
FIG. 13 is a side elevation view of a mounting tool having the two halves of the main body of the leading edge mounted thereto.

Referring now to FIGS. 12-14, there is illustrated another non-limiting process for forming a leading edge in accordance with the present invention. The mounting tool or mandrel illustrated in FIGS. 12-14 is the same or similar to the mounting tool or mandrel illustrated in FIGS. 1-4. As such, the parts and function of the mounting tool or mandrel will not be repeated herein and the same reference numbers for the mounting tool or mandrel will be used.

FIG. 12 illustrates a main body 602 that is formed of first and second body portions 610, 620. Body portions 610, 620 form the leg sections of the main body. Body portions 610, 620 have generally the same shape, size and configuration; however, this is not required. The composition of body portions 610, 620 is generally the same; however, this is not required. The composition of body portions 610, 620 can be the same or different from the composition of the main body of the leading edge as described above in FIGS. 1-4.

Body portions 610, 620 can be optionally stamped and/or laser cut from one or more pieces of a metal blank sheet piece. The body portions can be optionally machined to obtain a proper taper profile. The body portions can be optionally deburred. The body portions (e.g., top edges, etc.) can be optionally hot formed. The edges of the body portions can be optionally machined. The body portions can be optionally benched to remove burrs/remove surface anomalies as needed prior to connecting together the body portions.

As illustrated in FIGS. 13 and 14, body portions 610, 620 are secured to the mounting tool or mandrel 200 by mount posts 210, 212. Body portion 540 is positioned on the top edge of the top portion of the mounting tool or mandrel. As illustrated in FIG. 13, the top edges 612, 622 of body portions 610, 620 are spaced apart from one another once the body portions are clamped and secured on mounting tool or mandrel 200.

Once the body portions 610, 620 are positioned and secured on the mounting tool or mandrel, a metal deposition layer 630 is applied to the top portion of the mounting tool or mandrel and to the top edges 612, 622 of body portions 610, 620 as illustrated in FIG. 14. The metal deposition layer is used to secure together body portions 610, 620 and to form the nose or top edge portion of leading edge 600. The metal deposition device used to apply the metal deposition layer 630 to the top portion of the mounting tool or mandrel and to the top edges 612, 622 of body portions 610, 620 can be the same or different from the metal deposition device described above with reference to FIGS. 1-4. The metal deposition layer generally fully or partially covers the top edges 612, 622 of body portions 610, 620; however, this is not required. Generally, metal deposition layer 630 covers about 80%-100% of edges 612 and 622, typically about 90%-100% of edges 612 and 622, and more typically about 95%-100% of edges 612 and 622.

The metal composition of the metal deposition layer is generally uniform; however, this is not required. The metal composition of the metal deposition layer is generally the same as or similar to the composition of the body portions 610, 620; however, this is not required. The size, shape and configuration of the metal deposition layer is non-limiting. As illustrated in FIG. 14, the metal deposition layer has a tapering profile as it extends upwardly from body portions 610, 620, this is not required. The top region of the metal deposition layer is illustrated as being rounded; however, this is not required. The height and shape of the metal deposition layer is controlled so as to obtain the designed profile of the end portion of the leading edge.

Prior to, during and/or after the forming of the metal deposition layer 630 on body portions 610, 620 of the leading edge 600, one or more of the forming process steps can optionally be conducted: a) X-ray and/or Ultrasonic NDT one or more portions of the leading edge, b) HIP one or more portions of the leading edge, c) heat treat and/or hot size one or more portions of the leading edge, d) machine body portions 610, 620 of the main body of the leading edge, e) machine the metal deposition layer, f) trim one or more portions of the leading edge, g) bench to remove burrs/remove surface anomalies as needed on one or more portions of the leading edge, h) roughen one or more portions of the leading edge (e.g., inner surface of the leading edge, etc.), i) etch and/or prime (depending on end use) one or more portions of the leading edge (e.g., inner surface of the leading edge, etc.), j) hot form/super plastic form ("SPF") one or more portions of the leading edge before and/or after applying the metal deposition layer and/or k) clean one or more portions of the leading edge prior to and/or after one or more of the processing steps.

Once the leading edge 600 is fully formed, it can then be inserted onto or bonded to a blade or airfoil part (not shown) by known methods.

Figure 15:
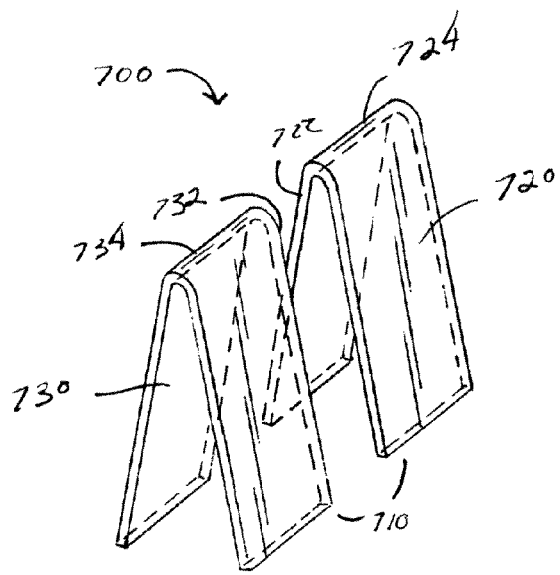
FIG. 15 is a side elevation view of two halves of the main body of a leading edge.
Figure 16:
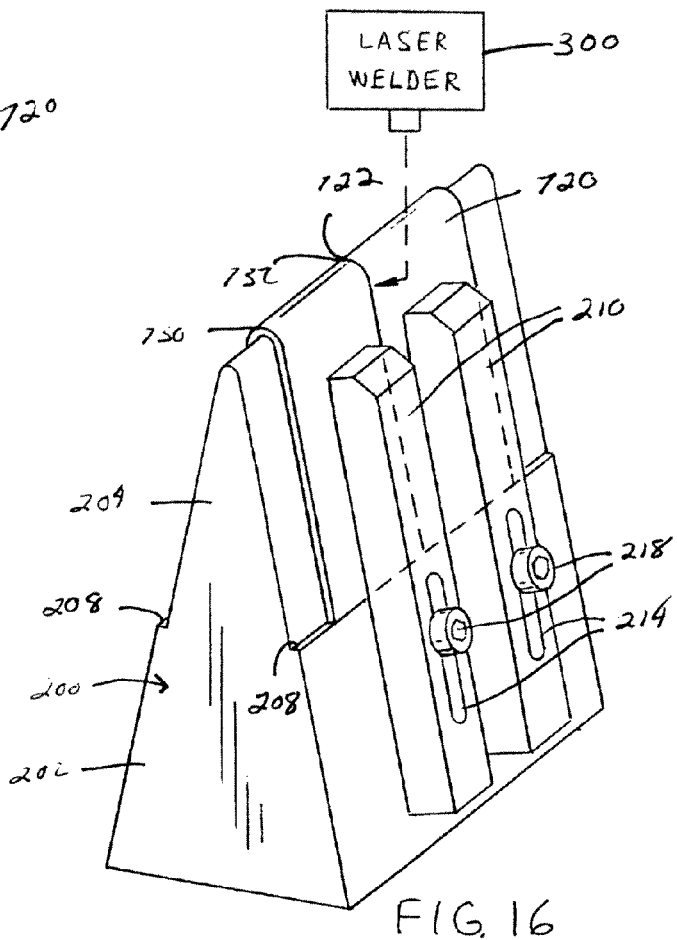
FIG. 16 is a side elevation view of a mounting tool having the two halves of the main body of the leading edge mounted thereto and welded together; and, FIG. 17 is a side view of FIG. 16 illustrating the step of depositing metal on the front end or nose of the main body of the leading edge.
Figure 17:
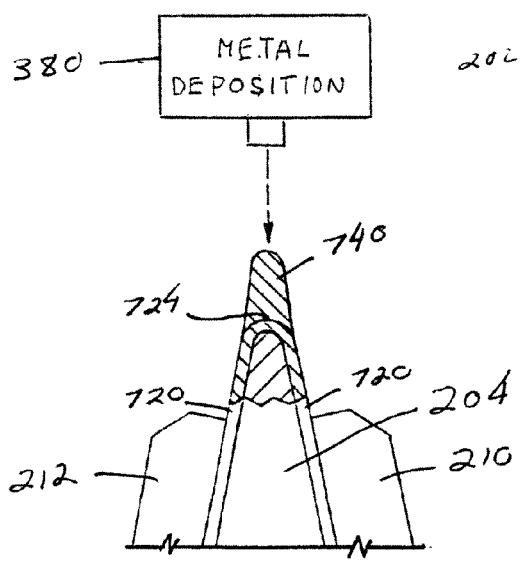

Referring now to FIGS. 15-17, there is illustrated another non-limiting process for forming a leading edge in accordance with the present invention. The mounting tool or mandrel illustrated in FIGS. 15-17 is the same or similar to the mounting tool or mandrel illustrated in FIGS. 1-4. As such, the parts and function of the mounting tool or mandrel will not be repeated herein and the same reference numbers for the mounting tool or mandrel will be used.

FIG. 15 illustrates a main body 710 that is formed of first and second body portions 720, 730. Each body portion includes two leg sections and a nose portion. Body portions 720, 730 have generally the same shape, size and configuration; however, this is not required. The composition of body portions 720, 730 is generally the same; however, this is not required. The composition of body portions 720, 730 can be the same or different from the composition of the main body of the leading edge as described above in FIGS. 1-4.

Body portions 720, 730 can be optionally stamped and/or laser cut from one or more pieces of a metal blank sheet pieces. The body portions can be optionally machined to obtain a proper taper profile. The body portions can be optionally deburred. The body portions (e.g., top edges, etc.) can be optionally hot formed. The edges of the body portions can be optionally machined. The body portions can be optionally benched to remove burrs/remove surface anomalies as needed prior to connecting together the body portions.

As illustrated in FIGS. 16 and 17, body portions 720, 730 are secured to the mounting tool or mandrel by mount posts 210, 212. The side edges 722, 732 of body portions 720, 730 are positioned in contact with one another or positioned closely adjacent to one another.

Once the body portions 720, 730 are positioned and secured on the mounting tool or mandrel, the side edges 722, 732 are bonded together. As illustrated in FIG. 16, a laser welder 300 is used to bond together these side edges together. As can be appreciated, other or additional techniques can be used to bond together the side edges on body portions 720, 730. If a metal is used to weld together the edges, the composition of the metal used to form the weld is generally the same as or similar to the composition of body portions 720, 730; however, this is not required. The side edges can be bonded together down the middle of the side edge surfaces or off-center of the side edge surfaces.

After body portions are bonded together, a metal deposition layer 740 is applied to the top surface of body portions 720, 730 by a metal deposition device 380. The metal deposition device can be the same or different from the metal deposition device described above with reference to FIGS. 1-4. The metal deposition layer generally fully or partially covers the welded or bonded regions between side edges 722, 732 at the top edge or nose of body portions 720, 730. As illustrated in FIGS. 15-17, the top edge or nose 724, 734 of body portions 720, 730 is the top arcuate or curved portion of the body portions. As can be appreciated, the top edge or nose 724, 734 of body portions 720, 730 can have other or additional profiles. Generally, metal deposition layer 740 covers about 80%-100% of top edge or nose 724, 734 of body portions 720, 730, typically about 90%-100% of top edge or nose 724, 734 of body portions 720, 730, and more typically about 95%-100% top edge or nose 724, 734 of body portions 720, 730. The metal deposition layer also extends onto other portions of body portions 720, 730; however, this is not required.

The metal composition of the metal deposition layer is generally uniform; however, this is not required. The metal composition of the metal deposition layer is generally the same as or similar to the composition of the body portions 720, 730; however, this is not required. The size, shape and configuration of the metal deposition layer is non-limiting. As illustrated in FIG. 17, the metal deposition layer has a tapering profile as it extends upwardly from the top edge or nose 724, 734 of body portions 720, 730; however, this is not required. The top region of the metal deposition layer is illustrated as being rounded; however, this is not required. The height and shape of the metal deposition layer is controlled so as to obtain the desired profile of the end portion of the leading edge.

Prior to, during and/or after the forming of the metal deposition layer 740 on the top edge or nose 724, 734 of body portions 720, 730 of the leading edge 700, one or more of the forming process steps can optionally be conducted: a) X-ray and/or Ultrasonic NDT one or more portions of the leading edge, b) HIP one or more portions of the leading edge, c) heat treat and/or hot size one or more portions of the leading edge, d) machine body portions 720, 730, e) machine the metal deposition layer, f) machine the inner weld root of the nose and/or other areas on the main body of the leading edge, g) trim one or more portions of the leading edge, h) bench to remove burrs/remove surface anomalies as needed on one or more portions of the leading edge, i) roughen one or more portions of the leading edge (e.g., inner surface of the leading edge, etc.), j) etch and/or prime (depending on end use) one or more portions of the leading edge (e.g., inner surface of the leading edge, etc.), k) hot form/super plastic form ("SPF") one or more portions of the leading edge before and/or after applying the metal deposition layer and/or l) clean one or more portions of the leading edge prior to and/or after one or more of the processing steps.

Once the leading edge 700 is fully formed, it can then be inserted onto or bonded to a blade or airfoil part (not shown) by known methods.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

We claim:

1. A method for forming a part for use as a leading edge reinforcement on a blade or airfoil part comprising:
   a. providing a first main body, said first main body including first and second leg sections, said first and section leg sections each being a preformed component, said first and second leg sections each having a front and back end and a side edge;
   b. bonding together said front end of each of said first and second leg sections at a bond region by a weld bead or diffusion bond to form a bond region on a nose portion of said first main body prior to a metal deposition layer being applied to said nose portion; and,
   c. depositing a coating of metal on said first main body to build up a thickness of metal on said first main body to form a leading edge having a customized outer end portion, said metal deposition layer forming a complete outer end portion of the leading edge, said metal deposition layer applied to said front end of each of said first and second leg sections, said back end of said first and second leg sections spaced from one another, at least 80% of said front end of said first and second leg sections covered by said metal deposition layer, a majority of said first and second leg sections absent said metal deposition layer, said metal deposition layer covers said weld metal or diffusion bonded region on said nose portion, said metal deposition coating covering at least 80% of said bond region on a top surface of said nose portion, said metal deposition layer extending upwardly from said bond region.

2. The method as defined in claim 1, further including one or more processing steps selected from the group consisting of a) hot forming/super plastic forming one or more portions of the leading edge, b) machining at least portion of said first main body to obtain a desired tapered profile of one or more pieces of said first main body, c) deburr at least portion of said first main body, d) machine at least a portion of said first main body, e) bench at least a portion of said leading edge to remove burrs or surface anomalies from said leading edge, f) conduct X-ray or Ultrasonic NDT one or more portions of said leading edge, g) hot isostatic press one or more portions of said leading edge, h) heat treat or hot size the leading edge, I) machine an inner nose region weld root of said first main body, k) trim at least a portion of said leading edge, l) etch, prime and combinations thereof at least a portion of said leading edge, m) cut one or more portions of said first main body by a laser cutter, and n) clean one or more portions of the leading edge.

3. The method as defined in claim 1, wherein said metal deposition layer deposited on said first and second leg sections forming a sole bond between said front ends of said first and section leg sections, said metal deposition layer deposited over 80% of said front ends of said first and second leg sections, said metal deposition layer extending upwardly top edges of said first and second leg sections.

4. The method as defined in claim 1, further including the processing steps of a) hot forming/super plastic forming one or more portions of the leading edge, b) machining at least a portion of said first main body to obtain a desired tapered profile of one or more pieces of said first main body, c) deburr at least a portion of said first main body, d) machine at least a portion of said first main body, e) bench at least a portion of said leading edge to remove burrs or surface anomalies from said leading edge, f) conduct X-ray or Ultrasonic NDT testing on one or more portions of said leading edge, g) hot isostatic press one or more portions of said leading edge, h) heat treat or hot size the leading edge, i) machine an inner nose region weld root of said first main body, j) trim at least a portion of said leading edge, k) etch, prime and combinations thereof at least a portion of said leading edge, l) cut one or more portions of said first main body by a laser cutter, and m) clean one or more portions of the leading edge.

5. A method for forming a part for use as a leading edge reinforcement on a blade or airfoil part comprising:
   a. providing a first main body and a second main body, said first main body including first and second leg sections, said first and second leg sections of said first main body each being a preformed component, said first and second leg sections of said first main body each having a front and back end and a side edge, said second main body having first and second leg sections and a metal deposition layer that is applied to said second main body, said first and section leg sections of said second main body each being a preformed component, said first and second leg sections of said second main body each having a front and back end and a side edge;

b. bonding together said side edges of said first and second main bodies at a bond region by a weld bead or diffusion bond prior to a metal deposition layer being applied to said first and second main bodies, said bond region formed along one of said leg sections of said first and second main bodies; and, c. depositing a coating of metal on said first main body and said second main body to build up a thickness of metal on said first main body and said second main body to form a leading edge having a customized outer end portion, said metal deposition layer forming a complete outer end portion of the leading edge, said metal deposition layer applied to said front end of each of said first and second leg sections of said first main body, said back end of said first and second leg sections of said first main body spaced from one another, said metal deposition layer deposited over 80% of said bond region between said first and second main bodies, said metal deposition layer deposited over 80% of said front ends of said first and second leg sections of said first and second main bodies, said metal deposition layer extending upwardly from said first and second leg sections of said first and second main bodies, a majority of said first and second leg sections of said first and second main bodies absent said metal deposition layer.

6. A method for forming a part for use as a leading edge reinforcement on a blade or airfoil part comprising:

a. providing a first main body, said first main body including first and second leg sections, said first and second leg sections each being a preformed component, said first and second leg sections each having a front and back end and a side edge, said main body includes a preformed nose portion, and further including the step of bonding said nose portion to said first and second leg sections by weld metal or a diffusion bond, said step of bonding performed prior to a metal deposition layer being applied to said nose portion; and, b. depositing a coating of metal on said first main body to build up a thickness of metal on said first main body to form a leading edge having a customized outer end portion, said metal deposition layer forming a complete outer end portion of the leading edge, said metal deposition layer applied to said front end of each of said first and second leg sections, said back end of said first and second leg sections spaced from one another, at least 80% of said front end of said first and second leg sections covered by said metal deposition layer, a majority of said first and second leg sections absent said metal deposition layer, said metal deposition layer deposited over 80% of a bond region on a top surface between said nose portion and said first and second leg sections, said metal deposition layer deposited over 80% of said nose portion, said metal deposition layer extending upwardly from said nose portion.

7. A method for forming a reinforced metal component for use on a leading edge of a blade or airfoil part comprising:

a. providing a first main body, said main body including first and second leg sections, said first and second leg sections each being a preformed component, said first and second leg sections each having a front and back end;

b. bonding together said front end of each of said first and second leg sections at a bond region by a weld bead or diffusion bond to form a bond region on a nose portion of said first main body prior to a metal deposition layer being applied to said nose portion; and, c. depositing a coating of metal on said first main body to build up a thickness of metal on said main body to form a leading edge having a customized outer end portion, said metal deposition layer forming a complete outer end portion of the leading edge, said metal deposition layer applied to said front end of each of said first and second leg sections, said back end of said first and second leg sections spaced from one another, at least 80% of said front end of said first and second leg sections covered by said metal deposition layer, a majority of said first and second leg sections absent said metal deposition layer, said metal deposition layer covers said weld metal or diffusion bonded region on said nose portion, said metal deposition coating covering at least 80% of said bond region on a top surface of said nose portion, said metal deposition layer extending upwardly from said bond region; and, c. securing a leading edge reinforcement component to said leading edge of said metal component.

8. The method as defined in claim 7, further including one or more processing steps selected from the group consisting of a) hot forming/super plastic forming one or more portions of the leading edge, b) machining at least a portion of said first main body to obtain a desired tapered profile of one or more pieces of said first main body, c) deburr at least a portion of said first main body, d) machine at least a portion of said first main body, e) bench at least a portion of said leading edge to remove burrs or surface anomalies from said leading edge, f) conduct X-ray or Ultrasonic NDT testing on one or more portions of said leading edge, g) hot isostatic press one or more portions of said leading edge, h) heat treat or hot size the leading edge, i) machine an inner nose region weld root of said first main body, j) trim at least a portion of said leading edge, k) etch, prime and combinations thereof at least a portion of said leading edge, l) cut one or more portions of said first main body by a laser cutter, and m) clean one or more portions of the leading edge.

9. The method as defined in claim 7, further including the processing steps of a) hot forming/super plastic forming one or more portions of the leading edge, b) machining at least a portion of said first main body to obtain a desired tapered profile of one or more pieces of said first main body, c) deburr at least a portion of said first main body, d) machine at least a portion of said first main body, e) bench at least a portion of said leading edge to remove burrs or surface anomalies from said leading edge, f) conduct X-ray or Ultrasonic NDT testing on one or more portions of said leading edge, g) hot isostatic press one or more portions of said leading edge, h) heat treat or hot size the leading edge, i) machine an inner nose region weld root of said first main body, j) trim at least a portion of said leading edge, k) etch, prime and combinations thereof at least a portion of said leading edge, l) cut one or more portions of said first main body by a laser cutter, and m) clean one or more portions of the leading edge.

10. A method for forming a reinforced metal component for use on a leading edge of a blade or airfoil part comprising:

a. providing a first main body, said main body including first and second leg sections, said first and second leg sections each being a preformed component, said first and second leg sections each having a front and back end, said main body includes a preformed nose portion, and further including the step of bonding said nose portion to said first and second leg sections by weld metal or a diffusion bond, said step of bonding performed prior to said a metal deposition layer being applied to said nose portion;

b. depositing a coating of metal on said first main body to build up a thickness of metal on said main body to form a leading edge having a customized outer end portion, said metal deposition layer forming a complete outer end portion of the leading edge, said metal deposition layer applied to said front end of each of said first and second leg sections, said back end of said first and second leg sections spaced from one another, at least 80% of said front end of said first and second leg sections covered by said metal deposition layer, a majority of said first and second leg sections absent said metal deposition layer, said metal deposition layer deposited over 80% of a bond region on a top surface between said nose portion and said first and second leg sections, said metal deposition layer deposited over 80% of said nose portion, said metal deposition layer extending upwardly from said nose portion; and, c. securing a leading edge reinforcement component to said leading edge of said metal component.

* * * * *